US010220424B2

(12) United States Patent
Ervin

(10) Patent No.: US 10,220,424 B2
(45) Date of Patent: Mar. 5, 2019

(54) MICROBOT PIGGING SYSTEM AND METHOD

(71) Applicant: Kirt Ervin, Aviston, IL (US)

(72) Inventor: Kirt Ervin, Aviston, IL (US)

( * ) Notice: Subject to any disclaimer, the term of this patent is extended or adjusted under 35 U.S.C. 154(b) by 82 days.

(21) Appl. No.: 15/647,773

(22) Filed: Jul. 12, 2017

(65) Prior Publication Data

US 2017/0304880 A1    Oct. 26, 2017

Related U.S. Application Data

(62) Division of application No. 14/321,254, filed on Jul. 1, 2014, now Pat. No. 9,731,334.

(51) Int. Cl.
| | | |
|---|---|---|
| *B08B 9/04* | (2006.01) |
| *B08B 9/055* | (2006.01) |
| *F16L 55/40* | (2006.01) |
| *F16L 101/12* | (2006.01) |

(52) U.S. Cl.
CPC ............. *B08B 9/0551* (2013.01); *F16L 55/40* (2013.01); *F16L 2101/12* (2013.01)

(58) Field of Classification Search
None
See application file for complete search history.

(56) References Cited

U.S. PATENT DOCUMENTS

| 4,569,097 A | 2/1986 | Echols |
| 4,895,602 A | 1/1990 | Sagawa |
| 5,172,639 A | 12/1992 | Wiesman et al. |
| 6,916,383 B2 | 7/2005 | Quarini |
| 8,210,289 B1 | 7/2012 | Lu et al. |
| 2004/0111184 A1 | 6/2004 | Chiappetta et al. |
| 2008/0141474 A1 | 6/2008 | Kapustin et al. |
| 2011/0011299 A1 | 1/2011 | Beck |
| 2011/0203676 A1 | 8/2011 | Been et al. |
| 2011/0214872 A1 | 9/2011 | Crawford et al. |
| 2013/0310975 A1 | 11/2013 | Chalvet et al. |

OTHER PUBLICATIONS

International Search Report for corresponding PCT Appln No. PCT/US15/37700 dated Sep. 23, 2015.
Written Opinion for corresponding PCT Appln No. PCT/US15/37700 dated Sep. 23, 2015.
Lindsey Kratochwill, "A Self-Assembling Bot", May 2014, 1 page, Popular Science.
Zach Zorich, "Say Hello to the Little Space Race That Could", May 2014, 1 page, Popular Science.

*Primary Examiner* — Shay Karls

(74) *Attorney, Agent, or Firm* — Sandberg Phoenix & von Gontard P.C.

(57) ABSTRACT

A method for cleaning the interior of a pipe using a plurality of microbots, where each microbots has a propulsion device and a programmable computer processor operatively associated with the propulsion device, and each of said processors is programmed to instruct its associated propulsion device to operate in cooperation with one or more of the other microbot propulsion devices of said plurality of microbots to form a pig in the pipe having a mutable shape that dynamically and substantially conforms to the interior contours of the pipe.

5 Claims, 9 Drawing Sheets

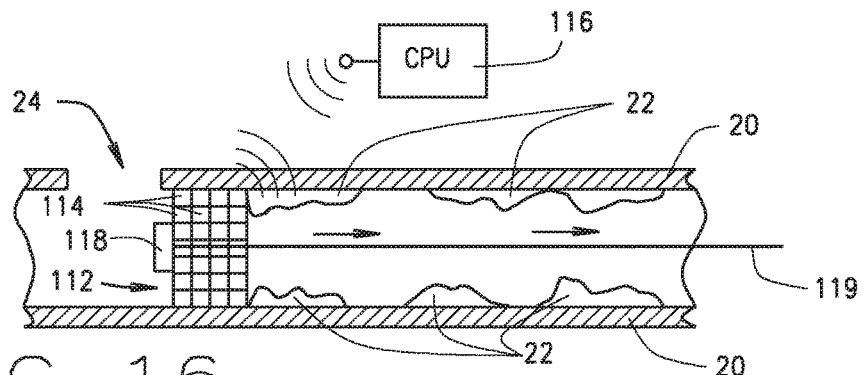
F I G . 1 6
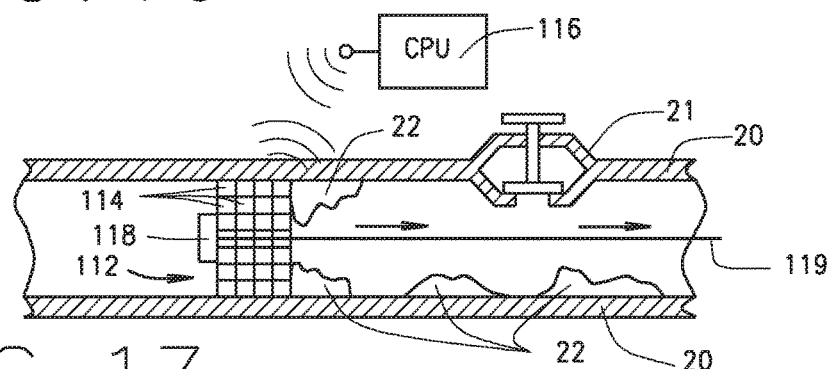
F I G . 1 7
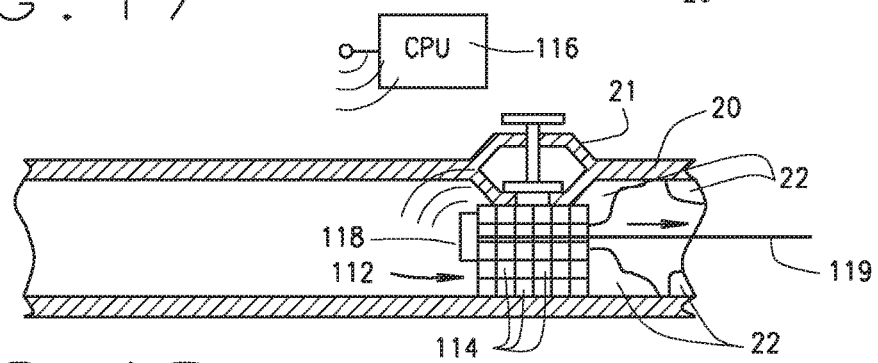
F I G . 1 8
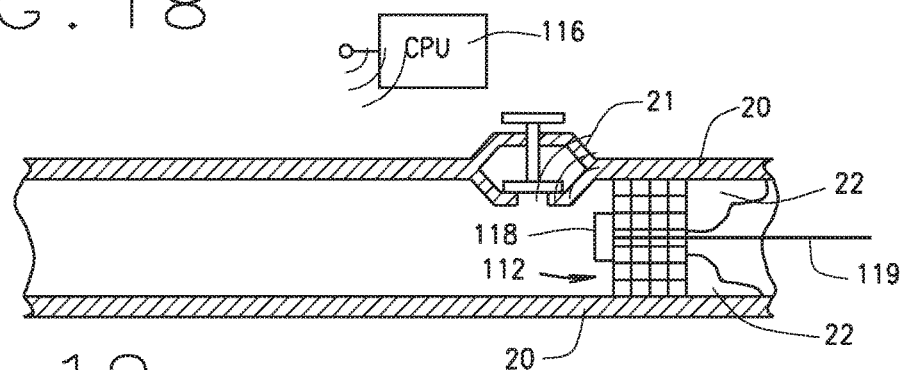
F I G . 1 9

US 10,220,424 B2

MICROBOT PIGGING SYSTEM AND METHOD

CROSS REFERENCE TO RELATED APPLICATIONS

This Application is a Divisional of and claims the benefits of co-pending U.S. Non-provisional application Ser. No. 14/321,254, entitled MICROBOT PIGGING SYSTEM AND METHOD, filed on Jul. 1, 2014, which is incorporated herein by reference.

STATEMENT REGARDING FEDERALLY SPONSORED RESEARCH OR DEVELOPMENT

Not applicable

BACKGROUND OF THE INVENTION

This invention relates generally to a pipe or conduit cleaning system, and more particularly to a novel pipe cleaning system that utilizes a collection of operationally interrelated micro robots, or "microbots", to form an innovative pigging mechanism that has a collective shape that conforms in real time to the contours of the interior walls of the pipe being cleaned as the collection moves through the interior of the pipe during cleaning.

"Pigging" is a procedure that is well known in the field of industrial pipe and conduit cleaning and clearing. This procedure involves forcing a plug-like device, known as a "pig", through the pipe or conduit to clean the pipe or clear the pipe of obstructions. In order to best clean or clear the pipe, the pig is generally sized and shaped to conform to the shape of the pipe's interior. The pig may be pushed or pulled through the pipe by a variety of means, including for example cables, rods or fluid pressure.

For the best cleaning results during the pigging procedure, it is desirable for the pig to fit as close to the interior walls of pipe as reasonably possible. In this way, the pig will clear out from the pipe the most material and debris as it passes through the pipe. Unfortunately, pigging with a pig nearly the size of the pipe interior is only possible for straight or nearly straight sections of pipe. A wide array of conditions can preclude the use of such a large pig. For example, variations in the size and shape of the pipe, as well as turns, intersecting pipes, valves and other obstructions, can all hinder the travel of an oversized pig through the pipe. Consequently, when a single pig is used for a length of pipe, the pig can be no larger than the smallest opening along the entire length of the pipe.

A number of devices and systems have been developed to overcome some of these difficulties. For example, in one such system, a collection of pigs is simultaneously forced through the pipe. This type of a system offers flexibility, but suffers from a lack of unitary strength that results in a less thorough cleaning. In another system, the pig is formed with a semi-frozen ice slurry that is then forced through the pipe. This is commonly known as "ice pigging." Ice pigging likewise has the benefit of flexibility along the length of the pipe, but also enables initiating pigging through small orifices into pigging zones in larger diameter pipes. However, the ice slurry melts during pigging, and ice pigging requires a great and constant supply of the ice or ice slurry during the process, which is very costly.

It would therefore be desirable to have a pigging system that is flexible enough to fit through small openings to reach the pigging zone, sturdy enough to provide an acceptable and thorough cleaning, and does not require constant resupply of components during operation.

As will become evident in this disclosure, the present invention provides benefits over the existing art.

BRIEF DESCRIPTION OF THE DRAWINGS

The illustrative embodiments of the present invention are shown in the following drawings which form a part of the specification:

FIG. 16 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with a draw plate positioned against the backside of the microbot pig that is attached to a cable to pull the pig through the pipe;

FIG. 17 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the draw plate pulling the microbot pig through the pipe and cleaning debris from the inner sides of the pipe and approaching a constriction in the pipe;

FIG. 18 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the draw plate pulling the microbot pig through the pipe and cleaning debris from the inner sides of the pipe in the vicinity of the pipe constriction, the pig having reconfigured to conform to the shape of the pipe in the constricted area;

FIG. 19 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the draw plate pulling the microbot pig through the pipe and cleaning debris from the inner sides of the pipe past the pipe constriction, the pig having reconfigured to conform to the shape of the pipe past the constricted area;

Corresponding reference characters indicate corresponding parts throughout the several views of the drawings.

DETAILED DESCRIPTION

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 10:
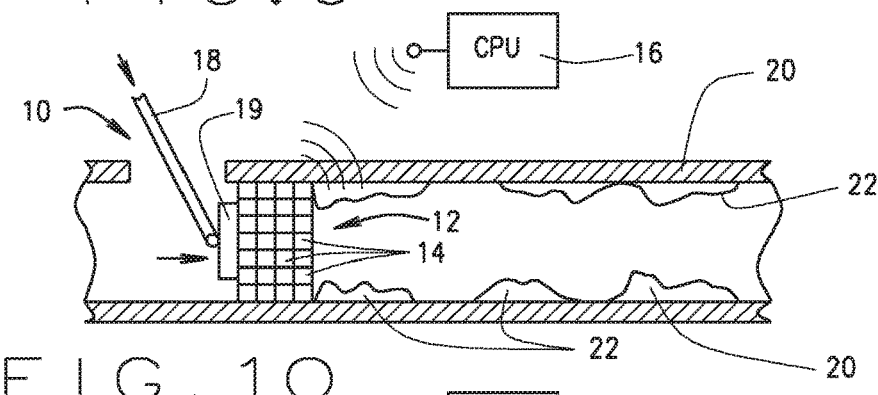
FIG. 10 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with a push rod and push plate positioned against the microbot pig to push the pig through the pipe.
Figure 11:
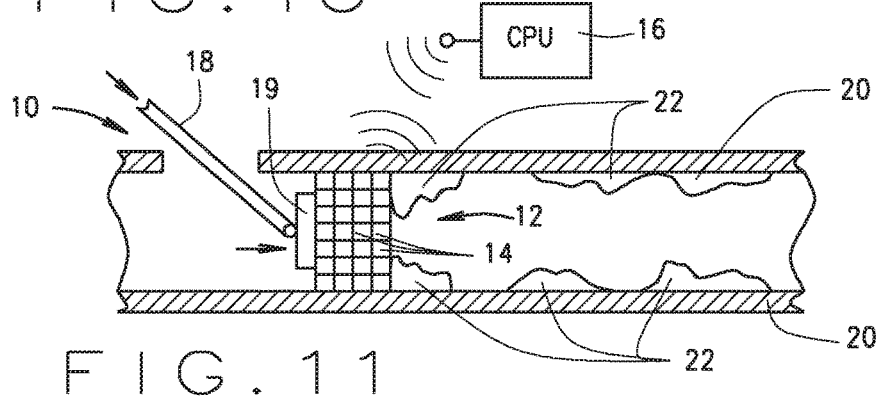
FIG. 11 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the push rod and push plate pushing the microbot pig through the pipe and cleaning debris from the inner sides of the pipe.

In referring to the drawings, a first embodiment of the novel microbot pigging system 10 of the present invention is shown generally in FIGS. 10-11, where the present invention is depicted by way of example. As can be seen, the mircrobot pigging system 10 comprises a collection or pig 12 of microbots 14, a programmable computer processor 16 and a propelling apparatus comprising a push rod 18 with a push plate 19 rotatably attached at one end. The processor 16 is programmed to wirelessly communicate with and control the microbots 14.

Figure 1:
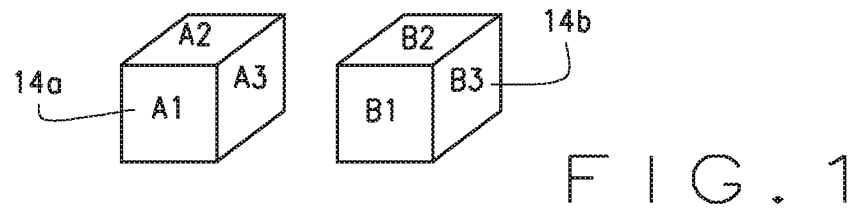
FIG. 1 is a perspective view of two representative generally cubic mircobots in proximity to, but not attached to, one another.

The operation, movement and interaction between each of the microbots 14 in the pigging system 10 is shown FIGS. 1-5, where a pair of representative microbots 14a and 14b are depicted by way of example to demonstrate the general operation of microbots. In FIG. 1, the microbots 14a and 14b are positioned in proximity to one another, but are stationary and apart. While microbots 14a and 14b are cubic in shape with six sides each, the pigging system 10 may comprise microbots of any variety of shapes and sizes, so long as such microbots can perform the functions necessary for the system 10 to operate properly as discussed in this disclosure. For purposes of reference, each of the six sides of the microbots 14a and 14b are enumerated A1-A6 and B1-B6.

Both of the microbots 14a and 14b are self-propelled such that they can rotate about various axes and move in a variety of directions. The actual propulsion mechanisms in the microbots 14a and 14b may be selected from a variety of propulsion mechanisms and configurations well-known in the microbot art, including for example, controllably rotatable magnetic components, retractable and/or disengagable mechanical wheels or tracks, fluid pressure devices, and extendable prods. In addition, each of the microbots 14a and 14b contain a set of attachment devices that enable the mircobots to selectively and releasably attach to each other at each face A1-A6 and B1-B6. The actual attachment devices for the microbots 14a and 14b may be selected from a variety of mechanisms and configurations well-known in the microbot art, including for example, electrically induced magnets, retractable latches or hooks, and traditional magnets.

Figure 2:
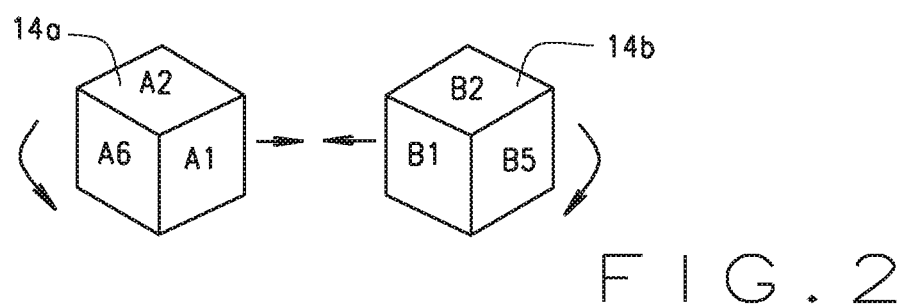
FIG. 2 is a perspective view of the two microbots of FIG. 1 rotating and moving toward one another to releasably attach face A1 of the first microbot to face B1 of the second microbot.
Figure 3:
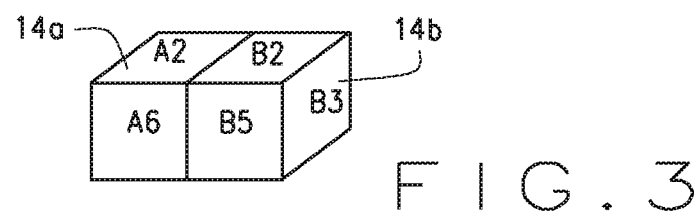
FIG. 3 is a perspective view of the two microbots of FIG. 1 releasably attached to one another at faces A1 and B1.
Figure 4:
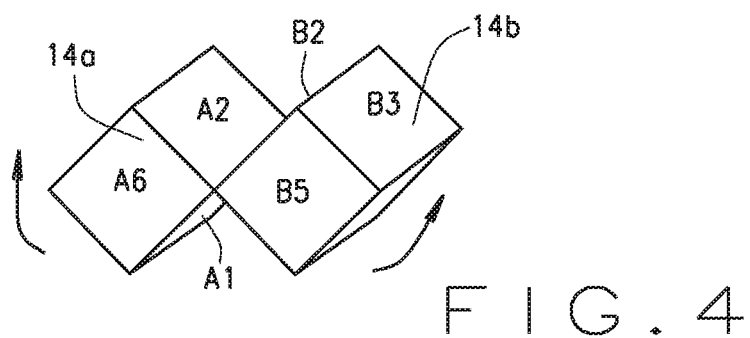
FIG. 4 is a perspective view of the two microbots of FIG. 1 rotating from their respective orientations depicted in FIG. 3 toward an orientation in which face A2 of the first microbot releasably attaches to face B2 of the second microbot.
Figure 5:
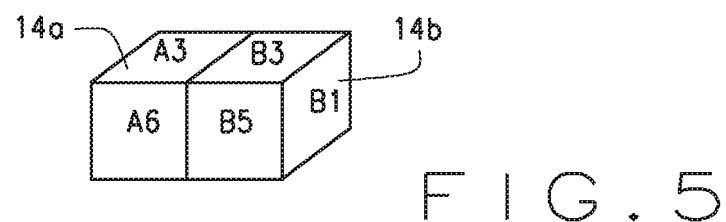
FIG. 5 is a perspective view of the two microbots of FIG. 1 releasably attached to one another at faces A2 and B2.
Figure 6:
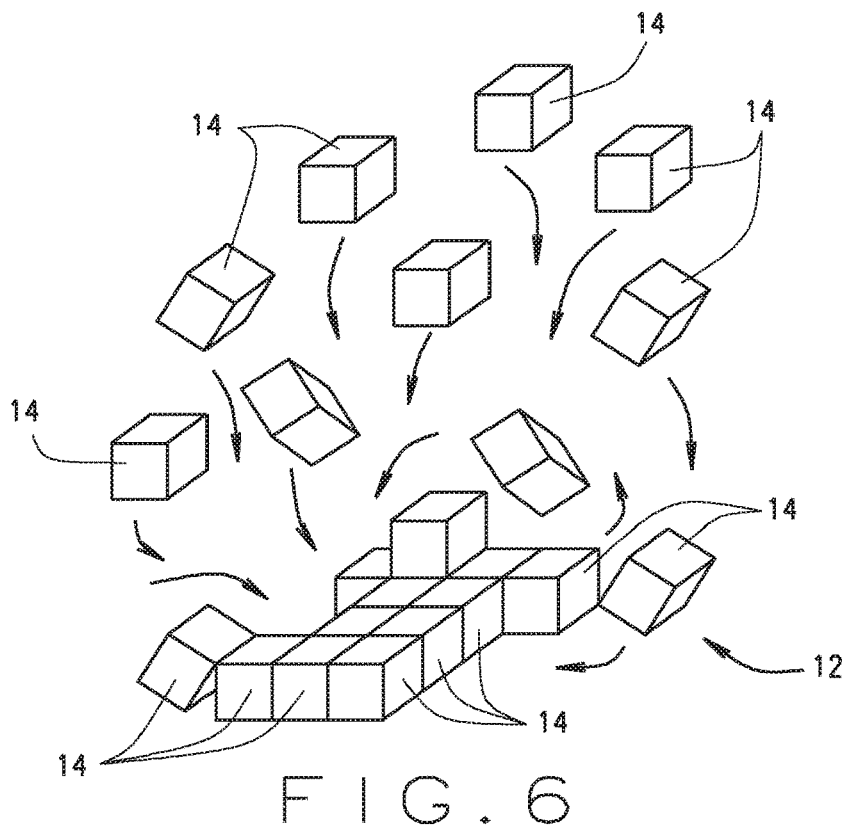
FIG. 6 is a perspective view of a plurality of representative generally cubic microbots rotating and moving towards each other, and releasably attaching to each other, to form a collective body.
Figure 7:
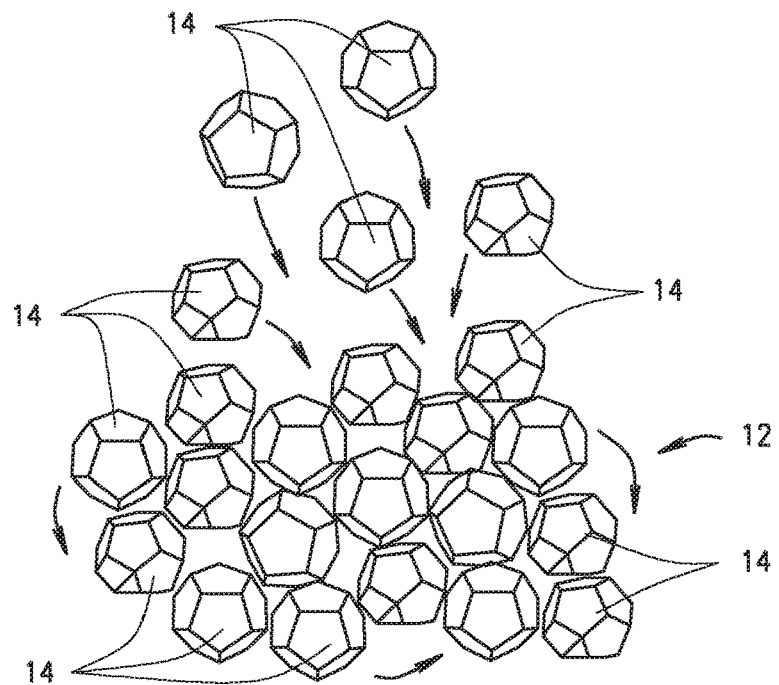
FIG. 7 is a perspective view of a plurality of representative generally 20-sided microbots rotating and moving towards each other, and releasably attaching to each other, to form a collective body.

In FIG. 2, it can be seen that should it be desired or necessary to attach the microbots 14a and 14b together at their respective sides A1 and B1 the microbots can independently rotate as depicted and move towards one another to align the sides A1 and B1 which will then releasably attach together as shown in FIG. 3. Should it then be desirable or necessary to attach side A2 of microbot 14a to side B2 of microbot 14b from the orientation with side A1 of microbot 14a attached to side B1 of microbot 14b, as depicted in FIG. 3, the microbots 14a and 14b can be simply rotate about their mutual edges adjoining sides a A1 and B1 (FIG. 4), to mate side A2 with side B2 as shown in FIG. 5. Of course, these are simply a few examples of the operation of a pair of representative microbots, which can be configured to move in virtually any direction and attach to each other along virtually any adjoining exterior surface. Further examples of such various orientations and relative movements of a number of microbots can be seen in FIGS. 6 and 7, where a plurality of microbots 14 are shown in the process of clustering to form a collection or pig 12.

Figure 8:
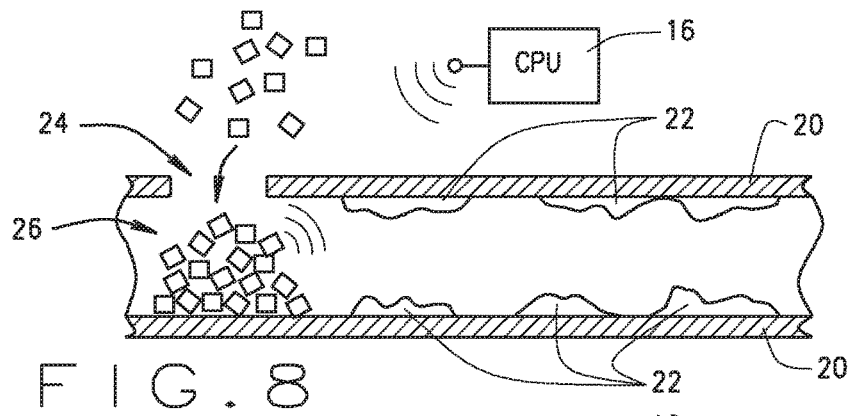
FIG. 8 is a cross-sectional view of a representative collective body of wirelessly controlled microbots being placed through an opening into a pipe to be cleaned, and a schematic representation of a computer processor controller wirelessly communicating with the microbots.
Figure 9:
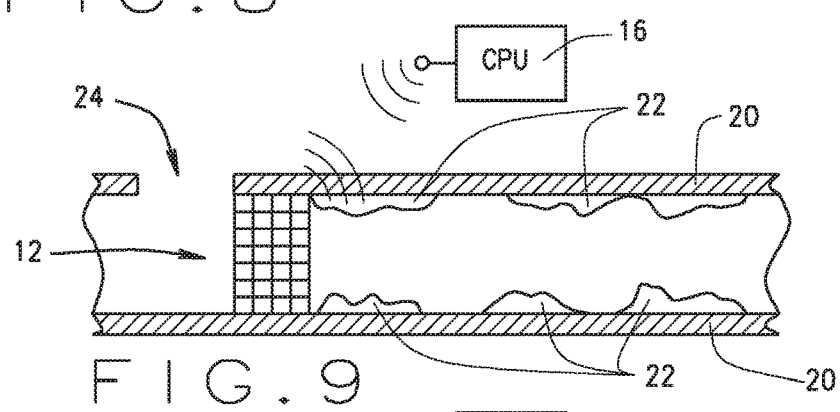
FIG. 9 is a cross-sectional view of the representative collective body of wirelessly controlled microbots and computer processor controller of FIG. 8 formed into the shape of a pig within the pipe to be cleaned by instructions wirelessly transmitted to the microbots from the computer processor.

FIGS. 8 through 11 depict a representative and a very basic version of the staged operation of the microbot pigging system 10 in a conduit or pipe 20 that is sought to be cleared of grime or debris 22. First, as seen in FIG. 8, a plurality of microbots 14 are placed through an opening 24 in the conduit 20, where they collect in a generally loose and unassociated pile or collection 26. Next, FIG. 9 shows that the microbots 14 are wirelessly instructed by the computer processor 16 to selectively move and attach together in a configuration that forms a pig 12 having a shape that closely matches the interior contours of the pipe 20. FIG. 10 shows that the push plate 19 is then positioned against the freshly formed pig 12 in preparation for pushing the pig 12 through the pipe 20. The push rod 18 extends through the opening 24 to facilitate manipulation of the rod 18 from a point external to the pipe 20. Finally, FIG. 11 depicts that the push rod 18 and push plate 19 then propel the pig 12 through the pipe 20 to push and scrape the grime and debris 22 ahead of the pig 12 for collection and removal. The pig 12 can at any time be allowed to disassemble for easy removal from the pipe 20.

Because the peripheral dimensions of the pig 12 closely match the inner contours of the pipe 20 only a small portion of the grime and debris 22 will be passed over by the pig 12. Consequently, the pig 12 will clear most of the grime and debris 22 from the pipe 20 and leave the inner surface of the pipe substantially clean with little residue. Of course, it is anticipated that the length and configuration of the pig 12 can be adjusted or adapted to allow for more efficient and effective cleaning of the entire pipe 20.

Figure 12:
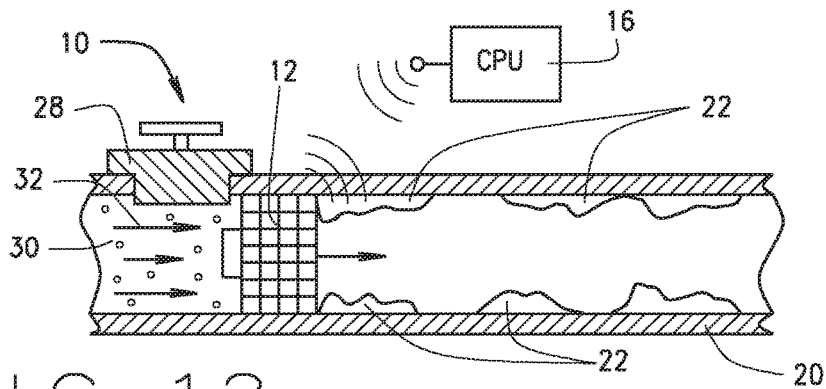
FIG. 12 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with a cap sealing the opening in the pipe and fluid pushed against the backside of the pig.
Figure 13:
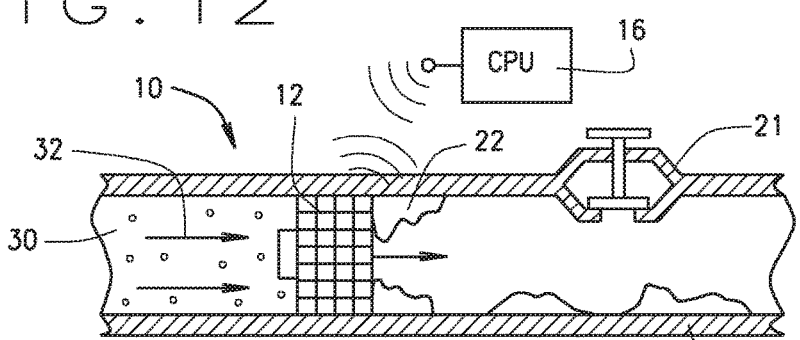
FIG. 13 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the fluid pressure pushing the pig through the pipe and cleaning debris from the inner sides of the pipe while approaching a constriction in the pipe.
Figure 14:
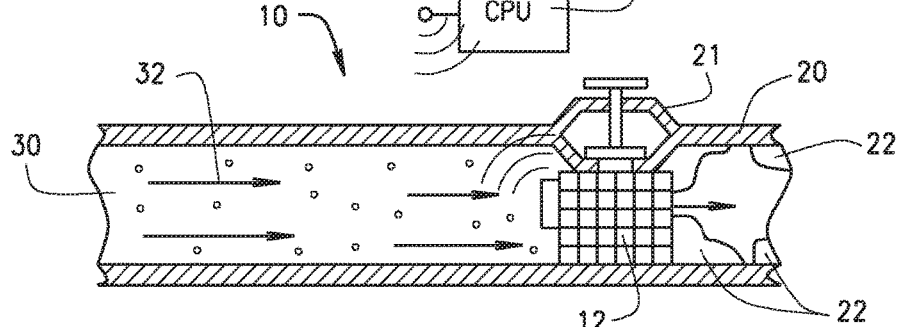
FIG. 14 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the fluid pressure pushing the microbot pig through the pipe and cleaning debris from the inner sides of the pipe in the vicinity of the pipe constriction, the pig having reconfigured to conform to the shape of the pipe in the constricted area.
Figure 15:
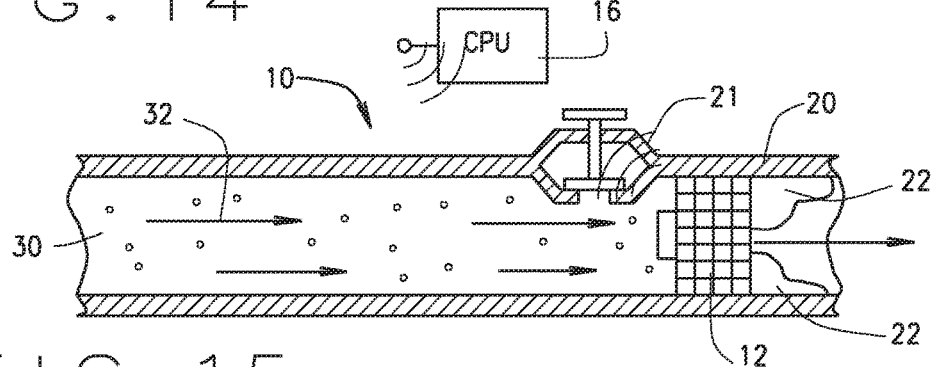
FIG. 15 is a cross-sectional view of the representative collective body of wirelessly controlled microbots and computer processor controller of FIG. 8 formed into the shape of a pig within the pipe to be cleaned by instructions wirelessly transmitted to the microbots from the computer processor, with the fluid pressure pushing the microbot pig through the pipe and cleaning debris from the inner sides of the pipe past the pipe constriction, the pig having reconfigured to conform to the shape of the pipe past the constricted area.

As an alternative, and as can be seen in the sequence of FIGS. 8-9 and 12-15, the pig 12 can be propelled through the pipe 20 by fluid pressure. That is, a plurality of microbots 14 are placed through an opening 24 in the conduit or pipe 20 (FIG. 8), where they collect in a generally loose and unassociated pile or collection 26. Next, FIG. 9 shows that the microbots 14 are wirelessly instructed by the computer processor 16 to selectively move and attach together in a configuration that forms a pig 12 having a shape that closely matches the interior contours of the pipe 20. In FIG. 12, it can be seen that a cap 28 closes and seals the opening 24 in the conduit or pipe 20 and fluid 30, preferably water, is backfilled behind the pig 12. FIGS. 12-15 depict the progress of the pig 12 as it is forced through the pipe 20 by backpressure 32 exerted against the pig 12 by the fluid 30 behind the pig 12. FIG. 14 depicts the pig 12 being forced toward an obstruction 21 in the pipe 20, which constrains or limits the inner dimensions of the pipe 20. As can be appreciated, such an obstruction would pose an extreme difficulty for a traditional pig to pass. However, as can be seen in FIGS. 14 and 15, the microbot pig merely has to reconfigure itself, at its own instruction or at the instruction of the processor 16, such that the dimensions of the pig 12 closely match those of the pipe 20 in the vicinity of the obstruction 21. Once the pig 12 is past the obstruction 21, it will once again expand to assume the dimensions of the inner surface of the pipe 21 without the obstruction 21. Of course, these reconfigurations are performed dynamically in "real time" to most effectively and efficiently clean the pipe 20. The pig 12 can at any time be allowed to disassemble for easy removal from the pipe 20.

A third embodiment of the present disclosure is depicted in the sequence of FIGS. 16-19, In this second embodiment, a microbot pigging system 100 is shown that likewise comprises a collection or pig 112 of microbots 114 and a programmable computer processor 116. However, in place of a propelling apparatus, such as the push rod 18 and push plate 19 of the first embodiment 10, this second embodiment 100 comprises a pull plate 118 positioned against side of the pig 112 facing away from the grime and debris 22 in the pipe 20. A cable is attached to the pull plate 118, threads through the center of the pig 112, and extends down the length of the pipe 20. The pull plate 119 holds the pull plate 118 to the side of the pig 112. As shown in FIGS. 17-19, and as can be appreciated, the cable 119 pulls the pull plate 118 against the side of the pig 112 to thereby pull the pig 112 through the pipe 20 in the direction of the cable 119 to clear the pipe 20 of the grime and debris 22 on the cable side of the pig 112.

Figure 21:
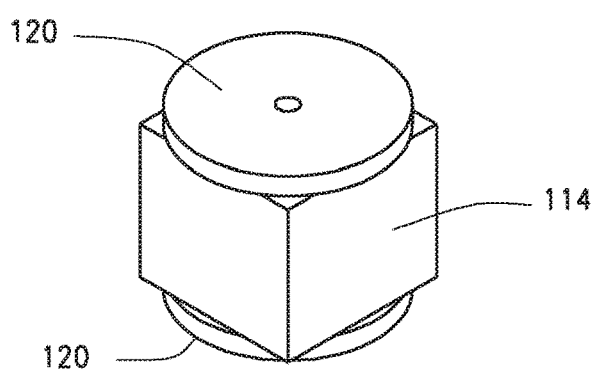
FIG. 21 is a perspective view of a representative self-propellable microbot capable of being used as part of an embodiment of a microbot pigging system of the present disclosure, the microbot incorporating a contour sensing system.
Figure 22:
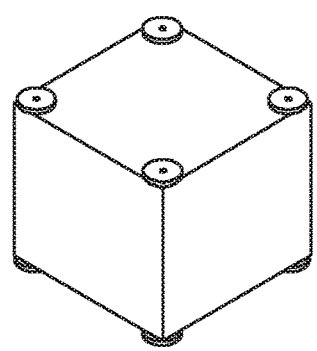
FIG. 22 is a perspective view of another representative self-propellable mircobot capable of being used as part of an embodiment of a microbot pigging system of the present disclosure.

In addition, at least one of the microbots 114 comprises a radio wave 3D scanner 120, such as for example is depicted in FIG. 21. The scanner 120 is configured to continuously sense and produce an electronic map of the contours of the inner surface of the pipe 20 in proximity to and relative to the position and current shape of the pig 112 and generate data representative of the electronic map. The scanner 120 wirelessly communicates its contour map data to the computer processor 116 on a continuous basis. The computer processor 116 in turn is programmed to utilize the contour map data to: (a) ascertain on a continuous basis the contours of the inner surface of the pipe 20 surrounding the pig 112 and in near proximity to the pig 112; (b) develop on a continuous basis a configuration or shape for the pig 112 that matches as closely as possible the inner surface of the pipe 20 surrounding the pig 112; and (c) instruct the microbots 114 to arrange themselves to form the pig 112 into a configuration or shape most closely mimicking the contours of the inner surface of the pipe 20 surrounding the pig 112. In alternate embodiments, the contour mapping feature of the present invention can be housed in the pig 12 itself. That is, one or more of the microbots 14 can be programmed to perform the contour map functions instead of the computer processor 116. Further, the microbots 114 can be configured to sense and react to changes in pressure in the pipe 20, such as for example when encountering an obstruction other than the grime 22.

This unique ability of the present invention is illustrated by way of example for the third embodiment 100 in the sequence of FIGS. 16-19, where the pipe 20 has a representative valve inclusion or obstruction 21 located along the top of the pipe 20 downstream of the opening 24. While traditional pigs having a fixed diameter would not be able to traverse the section of the pipe 20 under the inclusion 21 the applicant's microbot pigging system is fully capable of doing so.

That is, as the pig 112 is pulled through the pipe 20 by the cable 119 and the pull plate 118 (FIG. 17), the pig 112 pushes and scrapes the grime and debris 22 in front of the pig 112 for downstream collection and removal, In FIG. 18, it can be seen that as the pig 112 approaches the valve inclusion 21, which would for traditional pigs be an obstacle that would interfere with or entirely halt the pigging operation, the computer processor 116 instructs the microbots 114 to gradually reconfigure into a shape that dynamically conforms to the contours of the inner surface of the pipe 20 below the valve inclusion 21 as the pig 112 passes the inclusion 21. That is, the computer processor 116 instructs the microbots 114 to initially reconfigure the pig 112 more compactly, while still maintaining close tolerance to the inner contours of the pipe 20, even as the inner contours of the pipe 20 change along the length of the inclusion 21. Of course, the microbots 114 could alternatively be programmed to make such adjustments on their own or in cooperation with each other as part of the pig 112. As the pig 112 begins to pass the inclusion 21 (FIG. 18), the computer processor 116 instructs the microbots 114 to spread out and reconfigure the pig 112 into a shape that gradually becomes less compact, while still maintaining close tolerance to the inner contours of the pipe 20. When the pig 112 passes beyond the valve inclusion 21 (FIG. 19), the computer processor 116 will have instructed the microbots 114 to reconfigure the pig 112 to again match the original contours of the inner surface of the pipe 20.

Figure 20:
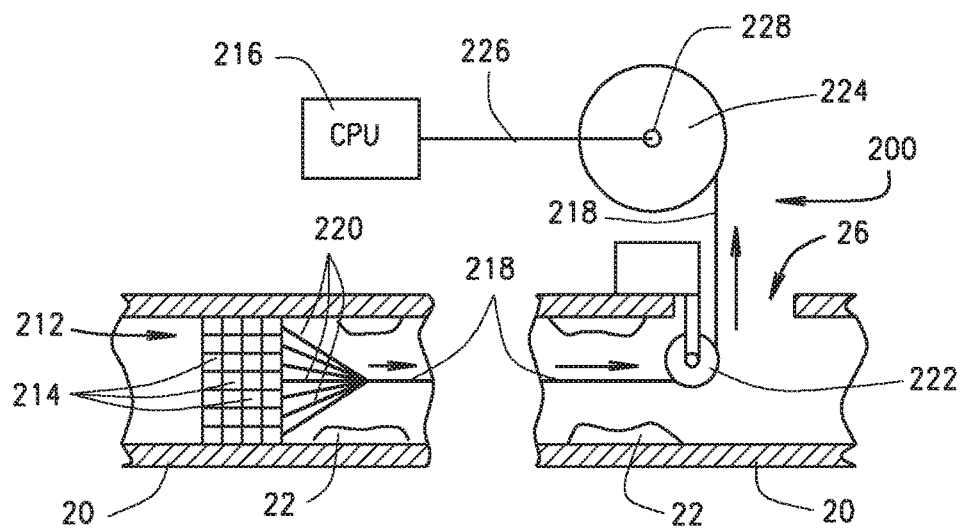
FIG. 20 is a cross-sectional view of a representative collective body of wire-controlled microbots being pulled through a pipe to be cleaned and cleaning debris from the inner sides of the pipe in the vicinity of the pig, and a schematic representation of a pulley system and computer processor controller controlling the microbots.

A fourth embodiment of the present disclosure is depicted in FIG. 20. In this third embodiment, a microbot pigging system 200 is shown that likewise comprises a collection or pig 212 of microbots 214 and a programmable computer processor 216. However, in place of a propelling apparatus, such as the push rod 18 and push plate 19 of the first embodiment 10, this third embodiment 200 comprises a cable 218 that comprises a collection of individual electronic wires 220 that connect physically and electronically to each of the microbots 214. The cable 218 serves two purposes. First, the cable 214 is drawn from the pig 212, through the pipe 20, across a pulley 222 or other such similar device, out of an opening 26 in the pipe 20, and onto to a spool 224 or other device that pulls the pig 212 through the pipe 20 to clear the grime and debris 22 along the inner surface of the pipe 20. The spool 224 also draws and collects the cable 214. Secondly, an electronic wire 226 and associated rotational connector 228 operatively connect the computer processor 216 to the cable 218 and the collection of wires 220 from the microbots 214. The cable 214 thereby serves as the electronic channel of communication between each of the microbots 214 and the computer processor 216. Thus, the cable 218 replaces the wireless communication of the first and second embodiments.

While I have described in the detailed description several configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel mechanisms of the present invention, shown by way of example at 10, 100 and 200, can be arranged in a number of other and related varieties of configurations without departing from or expanding beyond the scope of my invention as set forth in the claims.

For example, the microbots 14 can be configured and constructed of varying materials, shapes and sizes without departing from the teachings of this disclosure. One skilled in the art will recognize that in general, the smaller the dimensions of the microbots 14, the more closely the pig 12 can be configured by the computer process 16 to conform to the inner dimensions of the pipe 20. Further, for particular applications, the microbots 14 can be configured in shapes adapted to provide a scouring benefit to the pig 12. For example, in a pipe 20 that is constructed of plastic, it may be advantageous to use microbots 14 likewise constructed of plastic (as opposed a metal, for example) so as to minimize the potential for abrasive damage to the inner surface of the pipe 20 from contact with the microbots 14.

By way of another example, the computer processor 16 or the computer processors of one or more of the microbots 14 of the pig 12 may be configured and programmed to monitor the inner dimensions of the pipe 20 for any substantial changes to the contour or inner dimensions of the pipe 20 and to adjust the dimensions of the pig 12 in response as needed in an ongoing basis.

In this respect, while the inclusion 21 is depicted graphically as a valve, the depiction is representative. That is, the section of the pipe 20 being cleaned may include any of a variety of other variations in the inner contours or dimensions of the pipe 20, including for example, obstacles or blockage such as a reduction in the inner diameter of the pipe 20, an opening in the side of the pipe 20, a split or "Y" in the pipe 20, sharp curves or angles in the pipe 20.

In addition, FIG. 21 depicts portions of the scanner 120 positioned on the outer surface of the microbot 114 and the depiction may be somewhat exaggerated for purposes of illustration. However, many different configurations of detectors and sensors may be employed in the systems 10, 100, 200 to achieve the same result of providing the computer processor 16, 116, 216 with data representative of the contours of the interior of the pipe 20 to properly operate the pig 12, 112, 212 of the present invention as discussed and disclosed herein. For example, the sensor 120 may comprise light, laser, sonar, sound or radio wave emitting and detecting sensors. Tactile sensors, such as for example vibration or proximity indicators, may also be utilized. Further, the sensor 120 can alternately be positioned entirely within the microbot 14, 114, 214.

As another example, the microbots 14 of the pig 12 can be constructed to house microprocessors of sufficient capability to eliminate the need for the microprocessor 16 altogether. In such a configuration, the plurality of microbots 14 comprising the pig 12 can be preprogrammed to communicate and operatively function with each of the other microbots 14 in the pig 12 to reactively shape and configure the pig 12 to appropriate shapes to conform to the inner contours of the pipe 20 as the pig 12 is propelled through and scours the pipe 20.

It is also possible to configure one or more of the microbots 14 in the pig 12 to be independently mobile, with sufficient power and thrust such that the pig 12 does not require a propulsion device (such as for example a push rod and push plate 18, 19, fluid 30 or fluid pressure 32, or a pull plate and cable 118, 119) to move through the pipe 20.

Additional variations or modifications to the configuration of the novel mechanism of the present invention, shown by way of example at 10 and 100, may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

Additional variations or modifications to the configuration of the novel mechanism of the present invention, shown by way of example at 10, 100 and 200, may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

Exemplary Computer Systems and Environments

While specific exemplary examples, environments and embodiments are discussed herein, one of skill in the art should be understood that this is done for illustration purposes only. A person skilled in this art will recognize that other components and configurations can be used without parting from the spirit and scope of this disclosure. In fact, after reading the following description, it will become apparent to a person skilled in the relevant art how to implement numerous disclosed and supported embodiments as in alternative examples, environments and embodiments.

Figure 23:
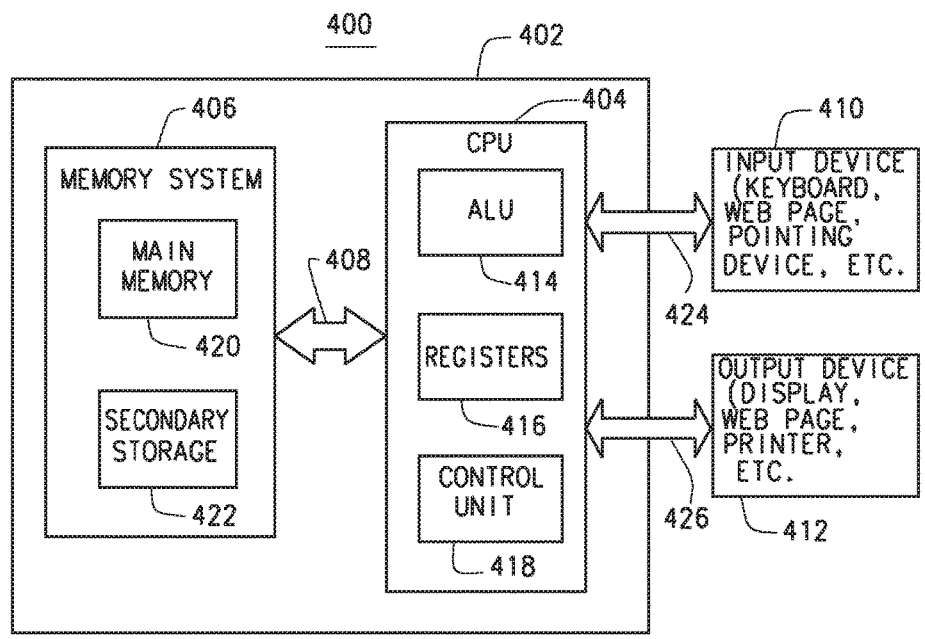
FIG. 23 is a block diagram of a representative computer system suitable for use with a mircrobot pigging system, all according to various embodiments of this disclosure.

Referring to FIG. 23, a representative operating environment for an illustrated embodiment of the present invention is a computer system 400 with a computer 402 that comprises at least one high speed processing unit ("CPU") 404, in conjunction with a memory system 406 interconnected with at least one bus structure 408, an input device 410, and an output device 412. These elements are interconnected by at least one bus structure 412.

The illustrated CPU 404 is of familiar design and includes an arithmetic logic unit ("ALU") 414 for performing computations, a collection of registers 414 for temporary storage of data and instructions, and a control unit 416 for controlling operation of the system 400. Any of a variety of processors, including at least those from Digital Equipment, Sun, MIPS, Motorola, NEC, Intel, Cyrix, AMD, HP, and Nexgen, are equally preferred for the CPU X. The illustrated embodiment of the invention operates on an operating system designed to be portable to any of these processing platforms.

The memory system 406 generally includes high-speed main memory 420 in the form of a medium such as random access memory ("RAM") and read only memory ("ROM") semiconductor devices, and secondary storage 422 in the form of long term storage mediums such as floppy disks, hard disks, tape, CD-ROM, flash memory, etc, and other devices that store data using electrical, magnetic, optical or other recording media. The main memory 420 also can include video display memory for displaying images through a display device. Those skilled in the art will recognize that the memory system 406 can comprise a variety of alternative components having a variety of storage capacities.

The input device 410 and output device 412 are also familiar. The input device 410 can comprise a keyboard, a mouse, a physical transducer (e.g., a microphone), etc. and is interconnected to the computer 402 via an input interface 424. The output device 412 can comprise a display, a printer, a transducer (e.g., a speaker), etc., and be interconnected to the computer 402 via an output interface 426. Some devices, such as a network adapter or a modem, can be used as input and/or output devices.

As is familiar to those skilled in the art, the computer system 400 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 406.

In accordance with the practices of persons skilled in the art of computer programming, the present invention is described below with reference to symbolic representations of operations that are performed by the computer system 400. Such operations are sometimes referred to as being computer-executed. It will be appreciated that the operations which are symbolically represented include the manipulation by the CPU 404 of electrical signals representing data bits and the maintenance of data bits at memory locations in the memory system 406, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The compute readable medium can be any of the devices, or a combination of the devices, described above in connection with the memory system 406.

Node-Node Environment

In one or more embodiments, the invention is practiced in the environment of a computer network or networks. The network can include a private network, or a public network (for example the Internet, as described below), or a combination of both. The network includes hardware, software, or a combination of both.

As skilled persons will recognize, from a high-level, telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them called interprocess communication pathways.

On these pathways, appropriate communications protocols are used. Skilled persons will recognize that the distinction between hardware and software is not always easily defined, with the same or similar functions capable of being performed with use of either. This is especially true for functionality associated with the communications between processes.

With reference to FIGS. 24-27, an exemplary computer and telecommunications network environment 500 is shown. Environment 500 includes nodes 502, 504, 506 and 508, which include hardware, software, or a combination of hardware and software. Nodes 502, 504, 506 and 508 are interconnected via communications network 520. Each node 502, 504, 506 and 508 includes one or more processes 512, 514, executable by processors 510 incorporated into the nodes.

Figure 24:
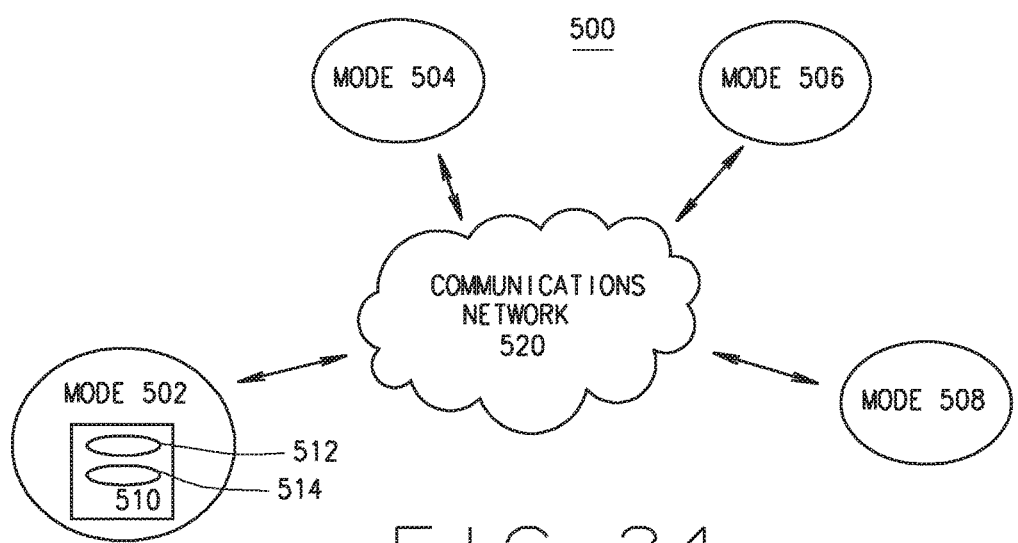
FIG. 24 illustrates a representative computer and telecommunications network environment according to one embodiment.

As shown in FIG. 24, it is possible that a single process 512 can be run by multiple processors, or that multiple processes 512, 514 can be run by a single processor 510. Additionally, each of nodes 502-508 can provide an interface point between network 500 and the outside world, and can incorporate a collection of subnetworks.

Persons of skill in the art will appreciate that the "software" processes 512, 514 include software and/or hardware entities that perform work over time, such as tasks, threads, and intelligent agents. Also, each process 512 can refer to multiple processes, for carrying out instructions in sequence or in parallel, continuously or intermittently.

In one embodiment, the processes 512, 514 communicate with one another through interprocess communication pathways (not labeled) supporting communication through any communications protocol. The pathways can function in sequence or in parallel, continuously or intermittently. The pathways can use any of the communications standards, protocols or technologies, described below with respect to communications network 520, in addition to standard parallel instruction sets used by many computers.

Nodes 502, 504, 506 and 508 include any entities capable of performing processing functions. Examples of nodes 502-508 that can be used with the present invention include computers (such as personal computers, workstations, servers, or mainframes), handheld wireless devices and wireline devices (such as personal digital assistants (PDAs), modern cell phones with processing capability, wireless e-mail devices including i-Phone™, BlackBerry™, Nook™ and i-PAP™ and similar devices), document processing devices (such as scanners, printers, facsimile machines, or multi-function document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between nodes 502-508 is made possible by communications network 520. A node 502-508 can be connected either continuously or intermittently with communications network 520. As an example, in the context of the present invention, communications network 520 can be a digital communications infrastructure providing adequate bandwidth and information security.

Communications network 520 can include wireline communications capability, wireless communications capability, or a combination of both, at any frequencies, using any type of standard, protocol or technology. In addition, in the present invention, communications network 520 can be a private network (for example, a VPN) or a public network (for example, the Internet).

A non-inclusive list of exemplary wireless protocols and technologies used by communications network 520 includes BlueTooth™, general packet radio service (CPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN).

Also included are various generation wireless technologies, as set forth in Table 1. It should be noted that the definitions provided therein and the other tables herein are provided for convenience of understanding the concepts of the present invention, and not by way of limiting the features and functions of the specification.

An exemplary non-inclusive list of primarily wireline protocols and technologies used by communications network 520 includes asynchronous transfer mode (ATM), enhanced interior gateway routing protocol (EIGRP), frame relay (FR), high-level data link control (HDLC), Internet control message protocol (ICMP), interiorgateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Mobile Telecom Terms 1G refers to the first generation wide area wireless (WWAN) communications systems, dated in the 1970s and 1980s. These devices are analog, designed for voice transfer and circuit-switched, and include AMPS, NMT and TACS.

2G refers to second generation WWAN communications, dated in the 1990s, characterized as digital, capable of voice and data transfer, and include HSCSD, GSM, CDMA IS-95-A and D-AMPS (TDMA/IS-136).

2.5G refers to the generation of WWAN communications between 2G and 3G.

3G refers to third generation WWAN communications systems recently coming into existence, characterized by data rates of 144 Kbps to over 2 Mbps (high speed), being packet-switched, and permitting multimedia content, including GPRS, 1 xRTT, EDGE, HDR, W-CDMA.

4G refers to fourth generation WWAN communications systems are characterized by very high- speed (over 20 Mbps) data rates, permitting high-resolution for video.

As noted, each node 502-508 includes one or more processes 512-514, executable by processors 510 incorporated into the nodes. In a number of embodiments, the set of processes 512, 514, separately or individually, can represent entities in the real world, defined by the purpose for which the invention is used.

Furthermore, the processes 512, 514 and processors 510 need not be located at the same physical locations. In other words, each processor 510 can be executed at one or more geographically distant processor (not shown), over for example, a LAN or WAN connection.

Persons of skill in the art will appreciate a great range of possibilities for practicing the invention using different networking hardware and software configurations.

Machine Instructions Environment

In one or more embodiments, the steps of the present invention are embodied in machine-executable instructions. The instructions can be used to cause a processing device, for example a general-purpose or special-purpose processor, which is programmed with the instructions, to perform the steps of the present invention.

Alternatively, the steps of the present invention can be performed by specific hardware components that contain hardwired logic for performing the steps, or by any combination of programmed computer components and custom hardware components.

For example, the present invention can be provided as a computer program product. In this environment, the invention can include a machine-readable medium having instructions stored on it. The instructions can be used to program any processor (or other electronic devices) to perform a process according to the present invention.

The machine-readable medium can include, for example, floppy diskettes, optical disks, CD-ROMs, and magneto-optical disks, ROMs, RAMs, EPROMs, EEPROMs, magnet or optical cards, or other type of media/machine-readable medium suitable for storing electronic instructions, but is not limited to the foregoing.

In addition, the present invention can also be downloaded as a computer program product. Here, the program can be transferred from a remote computer (e.g., a server) to a requesting computer (e.g., a client) by way of data signals embodied in a carrier or other propagation medium via a communication link (e.g., a modem or network connection).

Computer Hardware Environment

Figure 25:
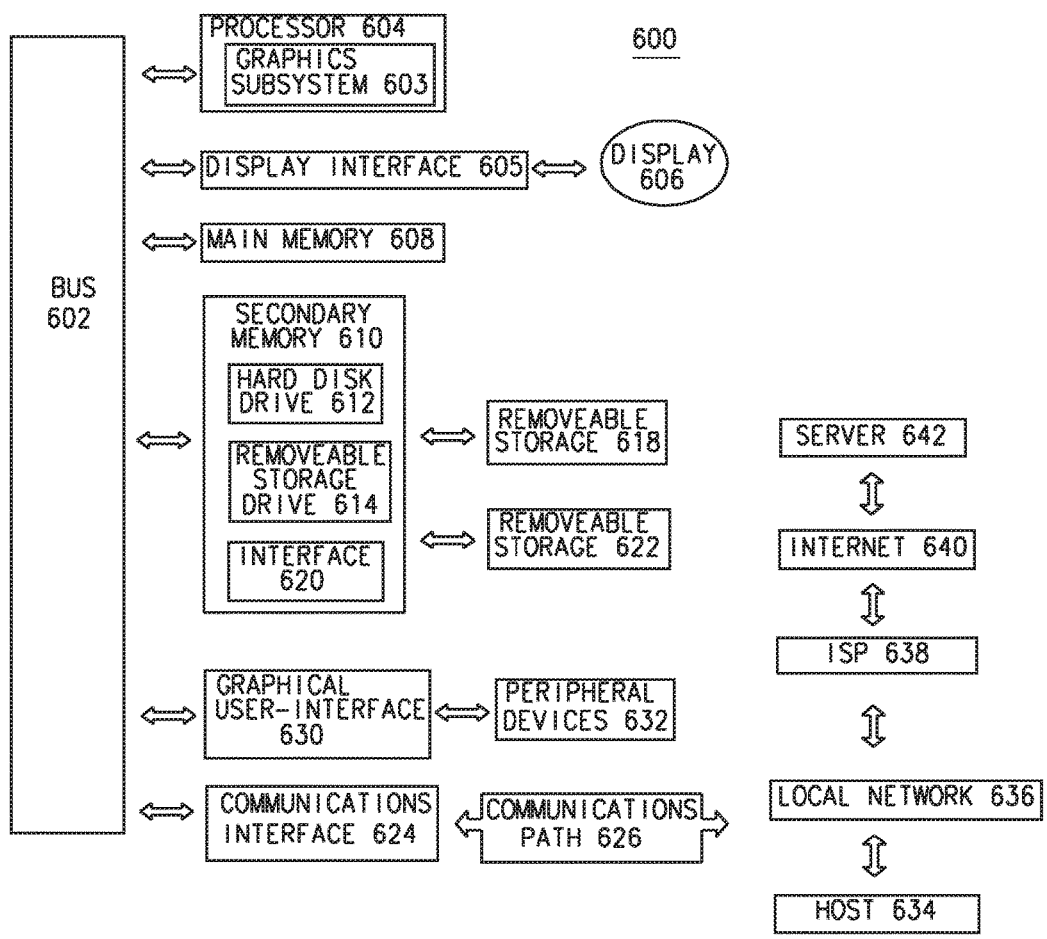
FIG. 25 illustrates a representative computer system environment according to another embodiment.

In one embodiment, illustrated in FIG. 25, node 510 is a computer system 600. Computer system 600 includes bus 602, processor 604 (including graphics subsystem 603), display interface 605, display 606, main memory 608, secondary memory 610 (including hard disk drive 612, removable storage drive 614, and interface 620), removable storage units 618, 622, graphical user-interface 630, peripheral devices 632 and communications interface 624. Computer system 600 is also connected via communications path 626 to external networks. Various embodiments are described in terms of this example computer system. After reading this description, it will be apparent to a person skilled in the relevant art how to implement the invention using other computer systems and/or computer architectures.

Processor 604, which can represent multiple processors, is connected to a communications bus 602. Graphics subsystem 603, shown as associated with processor 604, can be implemented as one or more processor chips. In fact, graphics subsystem 603 can be included as part of processor 604 as shown in FIG. 25 or as a separate graphics engine or processor. Graphics data is output from the graphics subsystem 603 to the bus 602.

Display interface 605 forwards graphics data from the bus 602 for display on the display unit 606. This graphics data includes graphics data for the screen displays described herein.

Main memory 608 can be a random access memory (RAM), and can also include a secondary memory 610. In the present invention the secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618 represents a floppy disk, magnetic tape, optical disk, etc., which is read by and written to by removable storage drive 614. As will be appreciated, the removable storage unit 618 includes a computer usable storage medium having stored therein computer software and/or data.

In alternative embodiments, secondary memory 610 can include other similar means for allowing computer programs or other instructions to be loaded into computer system 600. Such means can include, for example, a removable storage unit 622 and an interface 620. In the present invention examples can also include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Graphical user interface module 630 transfers user inputs from peripheral devices 632 to bus 606, These peripheral devices 632 can be a mouse, keyboard, touch screen, microphone, joystick, stylus, light pen, or any other type of peripheral unit.

Computer system 600 can also include a communications interface 624.

Communications interface 624 allows software and data to be transferred between computer system 600 and external devices via communications path 626. Examples of communications interface 624 that can be used with the present invention include a standard or cable modem, a DSL connection, a network interface (such as an Ethernet card), a communications port, a LAN connection, a WAN connection, etc. Computer programs and data transferred via communications interface 624 are in the form of signals which can be electronic, electromagnetic, optical or other signals capable of being received by communications interface 624, via communications path 626. Note that communications interface 624 provides a means by which computer system 600 can interface to a network such as the Internet.

The present invention can be implemented using computer programs (i.e., "software," or "computer control logic") running on Processor 604. The software can be originally stored as a "computer program product" on removable storage device 618 or hard disk drive 612. Therefore, computer program product refers to means for providing software to computer system 600.

Computer programs can also be stored in main memory 608 and/or secondary memory 610. Computer programs can also be received via communications interface 624. Such computer programs, when executed, enable the computer system 600 to perform the features of the present invention as discussed herein. In particular, the computer programs, when executed, enable the processor 604 to perform the features of the present invention.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant arts.

In the example environment shown, communication interface 624 provides a two-way data communication coupling via a communications path 626 to a local network 636. For example, if communication interface 624 is an integrated services digital network (ISDN) card or a modem, communication interface 624 provides a data communication connection to the corresponding type of telephone line, which comprises part of communications path 626. If communication interface 624 is a local area network (LAN) card, or connects to a LAN 636, then it can provide a data communication connection via communications path 626 to a compatible LAN. Wireless links are also possible. In any such implementation, communication interface 624 sends and receives electrical, electromagnetic or optical signals which carry digital data streams representing various types of information.

Communications path 626 typically provides data communication through one or more networks to other data devices. For example, in the present invention communications path 626 can provide a connection through local network 636 to host computer 634 or to data equipment operated by an Internet Service Provider (ISP) 638. In turn, ISP 638 provides data communication services through the worldwide packet data communication network now commonly called the "Internet" 640, described in detail in other embodiments.

Local network 636 and Internet 640 both use electrical, electromagnetic or optical signals that carry digital data streams. The signals through the various networks and the signals on communications path 626 and through communication interface 624, which carry the digital data to and from computer 600, are exemplary forms of carrier waves transporting the information.

Computer system 600 can send messages and receive data, as well as computer programs, through the network or networks, communications path 626, and communication interface 624. If the network used is the Internet, server 642 can transmit a requested code for an application program through Internet 640, ISP 638, local network 636 and communications path 626. Examples of such applications are the application programs run by application servers and database servers, as described in detail below.

Client-Server Environment

In one embodiment, the aforementioned nodes 822-828, processors 830, and processes 832, 834 running on the processors, are described by virtue of their functions with respect to information retrieval within a network.

Specifically, a node that requests information is termed a "client" and a node that transmits the requested information is termed a "server." A node can have the dual roles of serving as both a client as well as a server.

The processes running on the clients are termed client applications, and the processes running on a server are termed server applications. Information exchange occurs between the server application providing the information or services, and the client application receiving the provided information and services.

Figure 26:
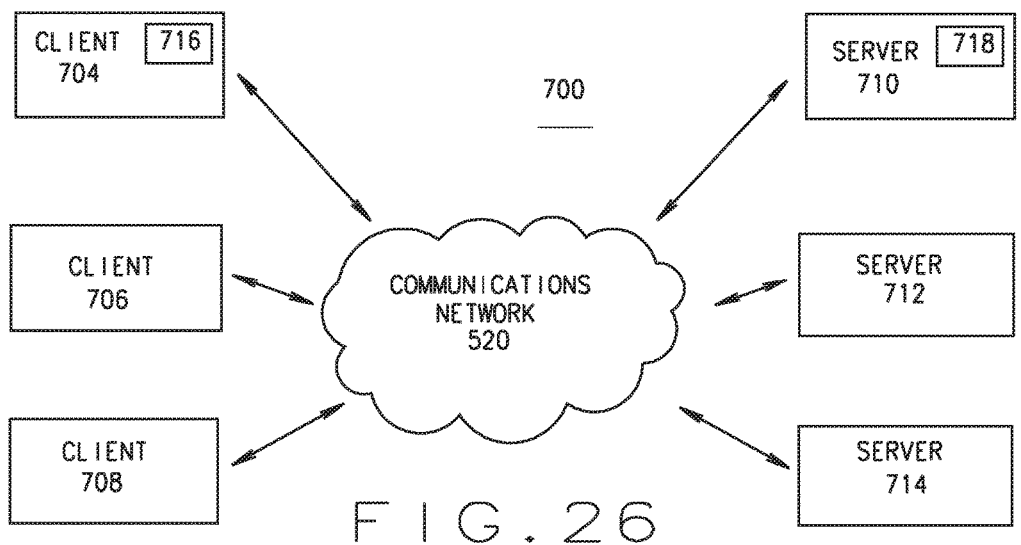
FIG. 26 illustrates a representative client-server environment according to yet another embodiment.

FIG. 26 illustrates an exemplary client-server environment 700. Client-server environment 700 includes the aforementioned communications network 520, which can be a national or an international network. It also includes a number of clients 704-708, and a number of servers 710-714. The clients 704-708 and the servers 710-714 are nodes connected to network 520, defined by their respective information retrieval functions.

Client 704 includes a client application 716, which is an information requesting or receiving application associated with client 704. Client application 716 either runs on client 704 or runs on another node and is passed to client 704.

Server 710 includes a server application 718, which is an information retrieval application associated with server 710. Server application 718 either runs on server 710 or runs on another node and is passed to server 710.

In operation, client application 716 is executed on client 704. In response, client 704 issues a request for information transmitted over network 520. The request is received by server 710, which executes server application 718. The requested information and/or services are then transmitted back to client 704 over network 520.

Internet and World Wide Web Environment

In these embodiments, an introduction of the Internet and how it is used in the context of the present invention is provided. As noted, network 520 can be any type of network, either private or public. In one or more embodiments, environment 700 (including network 520) refers to the Internet and World Wide Web (Web). In these embodiments, clients and servers transmit information in formats and media acceptable to the Internet and Web.

Internet refers to a worldwide system of interconnected computer networks that use the Transmission Control Protocol/Internet Protocol (TCP/IP) set of protocols. TCP/IP, in turn, typically refers to a bundle of network protocols, including: (i) the IP, a network layer protocol where unique IP addresses identify each network and each of its hosts, (ii) TOP, a connection-oriented protocol, where a connection is established via handshakes before any data is transmitted and (iii) certain application layer protocols, including telnet and file transfer protocol (FTP).

The parts of the Internet that are most widely used are electronic mail (e-mail) and the aforementioned Web. The Web is a network of computers located all over the world. These international computer networks can be comprised of clients and servers that users access to locate resources.

All the clients 704-708 and servers 710-714 in the Web can communicate with each other, and normally use a communication standard called Hypertext Transfer Protocol (HTTP). HTTP is an application protocol, i.e. a set of rules, for exchanging files on the Web that runs on top of TCP/IP.

The information on the Web is stored in documents called Web pages, which are files stored on the servers 710-714 comprising the Web. The clients 704-708 request the Web pages from the servers 710-714 (specifically server applications 718 running on the servers 710-714). More specifically, client applications 716 running on the clients 704-708 request the Web pages from server applications 718 running on the servers 710-714.

Displaying Information and Navigating on the Web

In these embodiments, the displaying of information and navigating on the Web in the context of the present invention is provided.

The client applications 716 are typically called Web browsers. Examples of well-known browsers 716 that can be used with the present invention include Spry's Mosaic, Microsoft's Internet Explorer, and Netscape's Navigator. Browsers 716 are capable of understanding a variety of program languages used to design the Web pages, as well as protocols used to transmit the Web pages.

Web browsers 716 have varying levels of sophistication and functionality. Each screen of information includes such items as highlighted words, graphics, menu choices, through which users can hyperlink (or "link") to retrieve further information, either from the client 704-708 itself (for local files) or from servers 710-714 located on the Web. Table 2 contains common Internet terms known to skilled persons.

The manner of displaying the retrieved informational content in a web browser 716 is primarily according to formatting and display languages. Examples of formatting and display languages that can be used with the present invention include Hyper Text Markup Language (HTML), eXtensible Markup Language (XML), eXtensible HyperText Markup Language (XHTML), and Cascading Style Sheets (CSS).

HTML is used to create text files that contain markup tags, which inform the browser how to display the page. HTML files must have an "htm" or "html" file extension, and can be created using a simple text editor. XML is a markup language, permitting users to define their own markup tags. The markup tags in XML are not predefined as with HTML, XML uses a Document Type Definition (DTD) or an XML Schema to describe the data. While HTML was designed to display data, focusing on how the data appears, looks, XML was designed to describe data, focusing on the data itself, providing the ability to structure, store, and to send information. XML is pared-down version of Standard Generalized Markup Language (SGML), specifically designed for Web documents. SGML is a comprehensive system for the organization and tagging of document elements. Rather than specifying particular formatting, SGML specifies the rules for tagging elements. XHTML is the same as a version of HTML referenced as HTML 4.01. It is HTML defined as an XML application and applies a strictly defined version of HTML. CSS is used to design stylesheet pages, which define how the document is displayed or printed to the browser. CSS sheets can be attached to the HTML document itself. The cascading feature supported by CSS permits a single document to use two or more stylesheets, which are applied according to specified priorities.

The manner of formatting the information for retrieval from servers 710-714 and transmitting the retrieved information over network 520 are determined by protocols. A variety of protocols can be used to implement the present invention over the Internet, including the aforementioned HTTP, FTP, telnet, as well as, for example, Internet Relay Chat (IRC).

The main protocol (or set of rules for navigation and exchanging of files between clients and servers) used on the Web is HTTP, designed for exchanging files running on top of TCP/IP. HTTP not only defines how messages are formatted and transmitted, but also what actions Web server applications 718 and browsers 716 should take in response to various commands.

The act of using a client browser 716 to download a Web page located at a server application 718 can also be called navigating the Web, or browsing the Web, or linking to Web sites on the Web. Each Web page has a Web address called a Uniform Resource Locators (URLs). Consequently, Web pages are located by linking to the URL of a Web page and displaying it in the browser 716. Users can link to Web pages by selecting or clicking on menu choices, highlighted words, or graphics associated with URLs. When a user enters a URL in his/her browser, or otherwise attempts to link to a website, it causes an HTTP command to be sent to the appropriate Web server, directing it to fetch and transmit the requested Web page.

Figure 27:
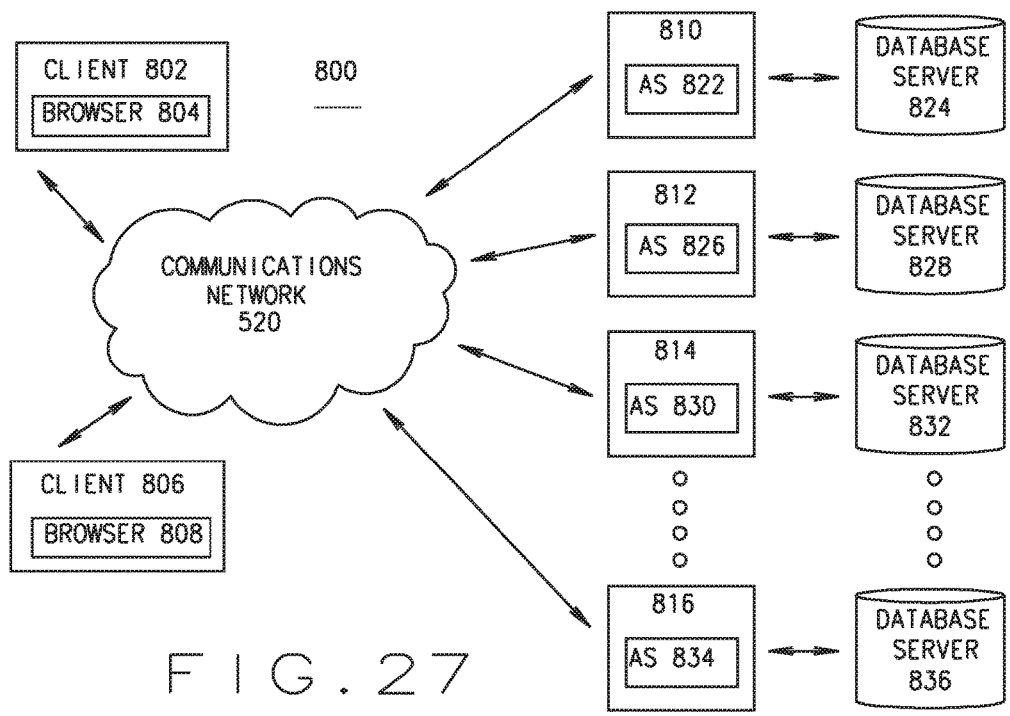
FIG. 27 illustrates a detailed representative client-server environment according to another embodiment.

FIG. 27 illustrates a detailed exemplary client-server environment 800. Environment 800 of FIG. 27 includes the aforementioned communications network 520, a plurality of clients 802, 806 and a plurality of servers 810, 812, 814, 816, connected to network 520. The servers are shown connected to a plurality of database servers (DSs). Specifically, server 810 is connected to DS 824, server 812 is connected to DS 828, server 814 is connected to DS 832, and server 816 is connected to DS 836.

The clients 802, 806 and the servers 810-816 are nodes connected to network 520, defined by their respective information retrieval functions. Client 802 includes a client application 804, which is an information requesting or receiving application associated with client 802, and client 806 includes a client application 808, which is an information requesting or receiving application associated with client 806. Client applications 804, 808 can run either on clients 802, 806, respectively, or can run on another node and are then passed to the clients 802, 806. In one or more embodiments, the client applications 804, 808 are web browsers.

Servers 810-816 include a variety of processes, including operating systems, web server applications and application servers. The operating systems, which can also be called platforms, are the software programs that applications use to communicate with the physical parts of the servers 810-816. Examples of operating systems that can be used with the present invention include: Linux™, Sun Solaris™, Windows NT/6000™, Cobalt RaQ™ and Free BSD™, although any operating systems known or anticipated can be used.

The web server applications are software running on servers 810-816 that make it possible for the client browsers 804, 808 to download stored web pages. These applications also coordinate streaming audio, video, and secure e-commerce, and can be integrated with databases (as described below) for information retrieval. Examples of web server applications that can be used with the present invention include: Apache™, Microsoft's Internet Information Server (IIS)™, O'Reilly & Associates WebSite Pro™, Netscape's FastTrack Server™, and StarNine's WebSTAR™ (for Macintosh), although any operating systems known or anticipated can be used.

The application servers sit on top of the formatting and display languages (for example, HTML) that a request from clients 802, 806 generate and translated the request for databases. Upon receiving information from databases, the application servers will translate this information back to the formatting and display languages and sent a response back to the browser. In one or more embodiments, the application server software resides at the servers 810-816, although with cross-platform programming technology, software performing the same functions can reside at clients 802, 806 as well. In one or more embodiments, the application servers will insert strings of programming code into the formatting and display language, with client browsers 804, 808 employing interpreters (or a plug-ins) to translate back into the formatting and display language (for example, HTML) to display a page. Examples of application servers that can be used with the present invention include: Cactus™, Cold Fusion™, Cyberprise Server™, Ejipt™, Enterprise Application Server™, Netscape Application Server™, Oracle Application Server™, PowerTier for C++™, PowerTier for Enterprise Java Beans™, Secant Extreme™, Enterprise Server™, SilverStream™, WebEnterprise™, WebSpeed™, and WebSphere™ although any application servers known or anticipated can be used.

Taken together, the web servers and applications servers perform at least these functions: (i) providing an environment upon which server components can run; (ii) functioning as is a main program under which other components run as subroutines; (iii) providing services (for example, security related services, transaction related services), state management, and resources (for example, database connections); (iv) enabling communication with clients 802, 806.

The variety of processes running on servers 810-816 can be written using any program languages and types. Some or all of the programs can be cross-platform applications that additionally to running on the servers (or instead of running thereon) run on the clients 802, 804. Examples of cross-platform programs are Java applets, which run on clients, and servlets, which run on servers. Examples of programming languages that can be used with the present invention include: CGI™, Per Java™, VBScript™, Python™, Microsoft ASP™, Java™, C++, Visual Basic, Enterprise JavaBean (EJB), although any languages known or anticipated can be used.

For the convenience of condensing terminology, the aforementioned applications working, which work together on the servers 810-816 (or instead are processed at other nodes and passed to servers 810-816) are referred to as "application servers." FIG. 27 illustrates applications servers (ASs) 822, 826, 830, 834 respectively running on clients 810, 812, 814, 816. In operation, client browsers 804, 808 are used to issue requests for information, or queued to transmit information, over network 520. Requests and responses are handled by servers 810-816 via running of ASs 822, 826, 830, 834, which in turn transmit information over network 520 for display by browsers 804, 808.

In one or more embodiments, additional functions required of ASs 822, 826, 830, 834 will be to connect the web servers 810-816 to, for example, back-end data resources such as relational tables, flat files, e-mail messages, and directory servers. In exemplary embodiments, additional programs incorporated in ASs 822, 826, 830, 834 typically called "middleware," database utilities, or database management systems (DMBS) can be used, among other known or anticipated database methods.

For example, the ASs 822, 826, 830, 834 can include their own internal DBMSs, or DBMSs of other nodes, or the DBMSs labeled database servers (DSs) 824, 828, 832, 836. The DBMS refers to computer software for storing, maintaining, and searching for data in a database. In the present invention, the DBMS can also utilize facilities for increasing reliability and performance, and integrity, such as indexes, logging, and record locking.

In one or more embodiments, the DBMS includes interfaces for searching for and locating particular data items from the database and for presenting the result of these queries to a search engine. A search engine as used herein searches the database in response to a user request, which can be initiated at client browser 802, 806, for example, or at server 822-824, for example, and returns a result to the user, for example in the form of a relational table viewable in browsers 804, 808. The DBMS can refer to any type of database, including a relational DBMS (RDBMS), LDAP™, VSAM™, IMS™, Active Directory Services™, message stores, to name a few.

In one or more embodiments, the DBMS is an RDBMS that uses relational database to retrieve information from the database. In one or more embodiments, the relational database uses structured query language (SQL™), including SQL defined according to International Standards Organization (ISO) and American National Standards Institute (ANSI) standards, or follow these standards with additional language constructs. In one or more exemplary embodiments, ASs 822-824 are respectively connected to DSs 824-836 via an application programming interface (API), including for example the open database connectivity (ODBC™), Java database connectivity (JDBC™), APIs.

In one or more embodiments, additional interfaces are used that can be employed for multiple types of databases, not just relational databases. One example is Microsoft's OLE-DB™, that provides access to all types of information, whether stored in RDBMS™, VSAM™, IMS™, Active Directory Services™, message stores among others.

Any types of DBMS platforms can be used in the present invention. Exemplary platforms employed include Sun Microsystems' Java™, 2 Platform, Enterprise Edition (J2EE)™, that contains an Enterprise JavaBeans™. (EJB) server-side component architecture, and Microsoft's Windows™, Distributed interNet Applications Architecture (Windows DNA™), which contains the COM+™ server-side component architecture.

Internet Terms
  ActiveXControl is a COM object that can be loaded from a server via interor intranet and run on any NT-client.
  Browser (or Web Browser) is a computer application that fetches Web pages from servers on the Internet and displays them on the user's local machine.
  CML (Chemical Markup Language) is an XML schema designed for handling information concerning chemical substances.
  COM (Component Object Model) is an MS-paradigm for connecting components, which has implemented the base technology for COM on the NT platform.
  CSS Cascading Style Sheets refers to a W3C Recommendation for files that when attached to a document will describe how the document is to be displayed or printed.
  DHTML (Dynamic HTML) is a standard for extending HTML that consists of HTML 4.0, DOM, CSS, and certain scripting languages.
  DocBook refers to XML and SGML DTDs and DSSSL/XSL stylesheets owned by OASIS for use in modeling manuals and converting them.
  DocZilla is the Web browser offered by CITEC that can render XML, SGML, and HTML documents.
  DTD Document Type Definition refers to a specification for schema specification for SGML and XML documents. The DTDs can be contained within a document or belong to an external subset that is referenced. Examples of DTDs include HTML, DocBook, CML, and IBTWSH. ebXML electronic business XML, A project jointly initiated by UN/CEFACT (e.g., the United Nations body for Trade Facilitation and Electronic Business) and OASIS to standardize XML business specifications. ebXML intends to develop a technical framework that will enable XML to be utilized in a consistent manner for the exchange of all electronic business data.
  FTP File Transmission Protocol refers to an application protocol for exchanging files over top of TCP/IP. FTP can be used to upload a webpage to a server.
  HTML Hypertext Markup Language is a DTD that consists of both text and tags widely used for performing document layout and performing hyperlinking. Java applets can be included using an <APPLET> tag. The current W3C version of HTML is HTML 4.0, which is also known as XML-compatible HTML (XHTML).
  HTTP Hypertext Transfer Protocol is the application protocol that controls the exchanging of files on the Web, and is within the architectural domain of W3C. IE Internet Explorer, the leading web-browser offered by Microsoft and provided free-of-charge with Microsoft operating systems.
  Internet is a worldwide system of computer networks based on the TCP/IP set of protocols. Its most widely used parts are electronic mail (e-mail) and the World Wide Web (WWW).
  Intranet A private network that is contained within an enterprise using TCP/IP, HTTP, and other Internet protocols. Intranets may include connections through gateway computers to the Internet using firewall servers for security.
  IP (Internet Protocol) is a protocol in the TCP/IP internet layer for communication between nets and their hosts.
  An IP-address uniquely identifies each network and each of its hosts on the internet. Addresses consist of four bytes that can be represented by four integers (0 to 255) separated by dots, e.g. "157.189.162.75". Dependent on the address' class and a subnet mask, a specific number of bits identify the net or subnet and the rest a PC's address within this net/subnet.
  ISO is the acronym for the International Organization for Standardization, which is an influential international federation of national standards organizations from over 500 countries.
  Java is an object oriented programming language that is cross-platform compatible and supports multithreading. Java is executed on any platform using the Java Virtual Machine (JVM).

Java Applet component written in Java that can be downloaded from a server via an intra- or internet and executed on a client. The applet runs in a sandbox, e.g. the security settings only allow the applet to access data located on the server the applet is downloaded from. Most browsers contain a Java Virtual Machine (JVM) and are thus capable of running applets.

JavaBeans refers to a Java component model where reusable "beans" are created using a Bean Development Kit (BDK).

Netscape Navigator refers to Netscape's web-browser, which is currently Navigator part of Netscape Communicator.

SGML (Standard Generalized Markup Language) is the standard for documents adopted in 1986 by the ISO for defining documents using DTDs. Document contents are identified by using semantic tags.

Tag is a vanilla term for a language element descriptor.

Markup usually refers to the set tags for a document.

TCP (Transmission Control Protocol) is a transport layer protocol, which is used to establish a proper connection (hand shaking) before any data is transmitted.

TCP/IP (Transmission Control Protocol/Internet Protocol) refers to the two primary Internet protocols, namely the Internet Protocol IP (from which colloquial usage of the term "Internet" comes) and Transport Protocol TCP. It can also refer to certain application protocols, including FTP and telnet.

URL (Universal Resource Locator) refers to the unique address of a document or a resource on the Internet.

W3C is the World Wide Web Consortium an influential industry consortium promoting and maintaining the standards for the Web. The consortium also handles interoperability issues between Web products through its production of specifications and reference software.

WAP (Wireless Application Protocol) refers to the primary standard for accessing the Internet using wireless devices.

WML (Wireless Markup Language) refers to the DTD used in WAP. (see above)

WWW (World Wide Web, or simply Web) refers to the resources and users on the "Internet" using the Hypertext Transfer Protocol (HTTP).

XHTML (Extensible HyperText Markup Language) refers to a reformulation of HTML 4.0 in XML 1.0.

XMLHTTP refers to "Microsoft.XMLHTTP" or an "XMLHttpRequest Object", which refer to the ActiveXControl enabling access to instances of HTTP request.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the representative embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A method of cleaning a pipe having an inner contour, the method comprising the steps of:
    a. placing a plurality of microbots in the pipe, each microbot comprising an attachment mechanism configured to releasably attach said each microbot to at least one other of said plurality of microbots and comprising a programmable computer processor operatively associated with the attachment mechanism;
    b. releasably attaching the plurality of microbots together o form a pig;
    c. urging the pig through at least a portion of the pipe; and
    d. removing the microbots from the pipe.

2. The method of claim 1, further comprising forming the pig in a configuration that complements the inner contour of the pipe.

3. The method of claim 1, wherein where the inner contour of the pipe changes along the length of the pipe, the method further comprises dynamically changing the shape of the pig to complement the interior contour of the pipe in response to changes in the interior shape of the pipe in proximity to the pig as the pig is urged through the pipe.

4. The method of claim 1, further comprising releasing at least a portion of the plurality of microbots from attachment to one another after urging the pig through at least a portion of the pipe.

5. The method of claim 1, further comprising forcing fluid against the pig to urge the pig through at least a portion of the pipe.

* * * * *